Dec. 12, 1967  L. F. KUTIK  3,357,058
APPARATUS FOR INJECTION MOLDING BRISTLED PRODUCT
Filed Oct. 31, 1966  8 Sheets-Sheet 1

INVENTOR.
LOUIS F. KUTIK

Dec. 12, 1967   L. F. KUTIK   3,357,058
APPARATUS FOR INJECTION MOLDING BRISTLED PRODUCT
Filed Oct. 31, 1966   8 Sheets-Sheet 2

INVENTOR.
LOUIS F. KUTIK

Dec. 12, 1967   L. F. KUTIK   3,357,058
APPARATUS FOR INJECTION MOLDING BRISTLED PRODUCT
Filed Oct. 31, 1966   8 Sheets-Sheet 3

INVENTOR.
LOUIS F. KUTIK

Dec. 12, 1967 L. F. KUTIK 3,357,058
APPARATUS FOR INJECTION MOLDING BRISTLED PRODUCT
Filed Oct. 31, 1966 8 Sheets-Sheet 5

INVENTOR.
LOUIS F. KUTIK
BY
ATTORNEYS

INVENTOR.
LOUIS F. KUTIK
ATTORNEYS

Dec. 12, 1967  L. F. KUTIK  3,357,058
APPARATUS FOR INJECTION MOLDING BRISTLED PRODUCT
Filed Oct. 31, 1966  8 Sheets-Sheet 7
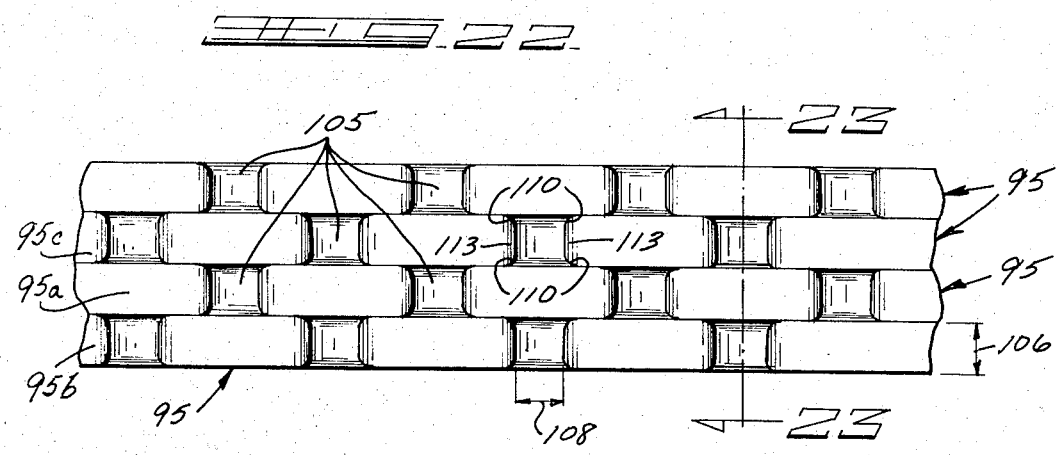
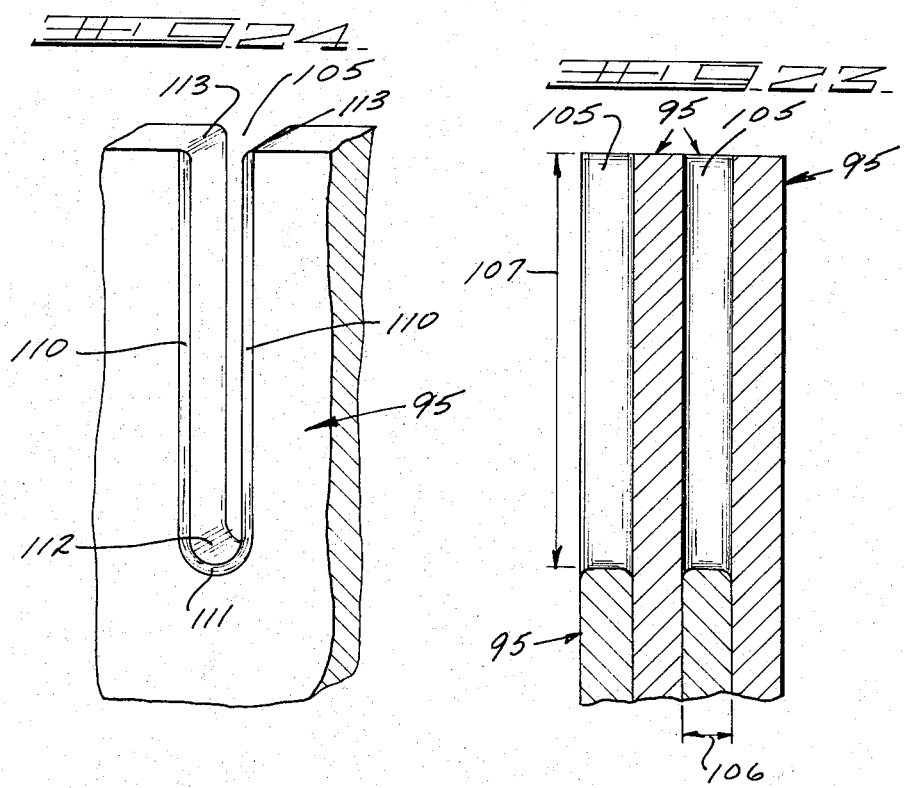
INVENTOR.
LOUIS F. KUTIK
BY
James N. Giles
ATTORNEYS

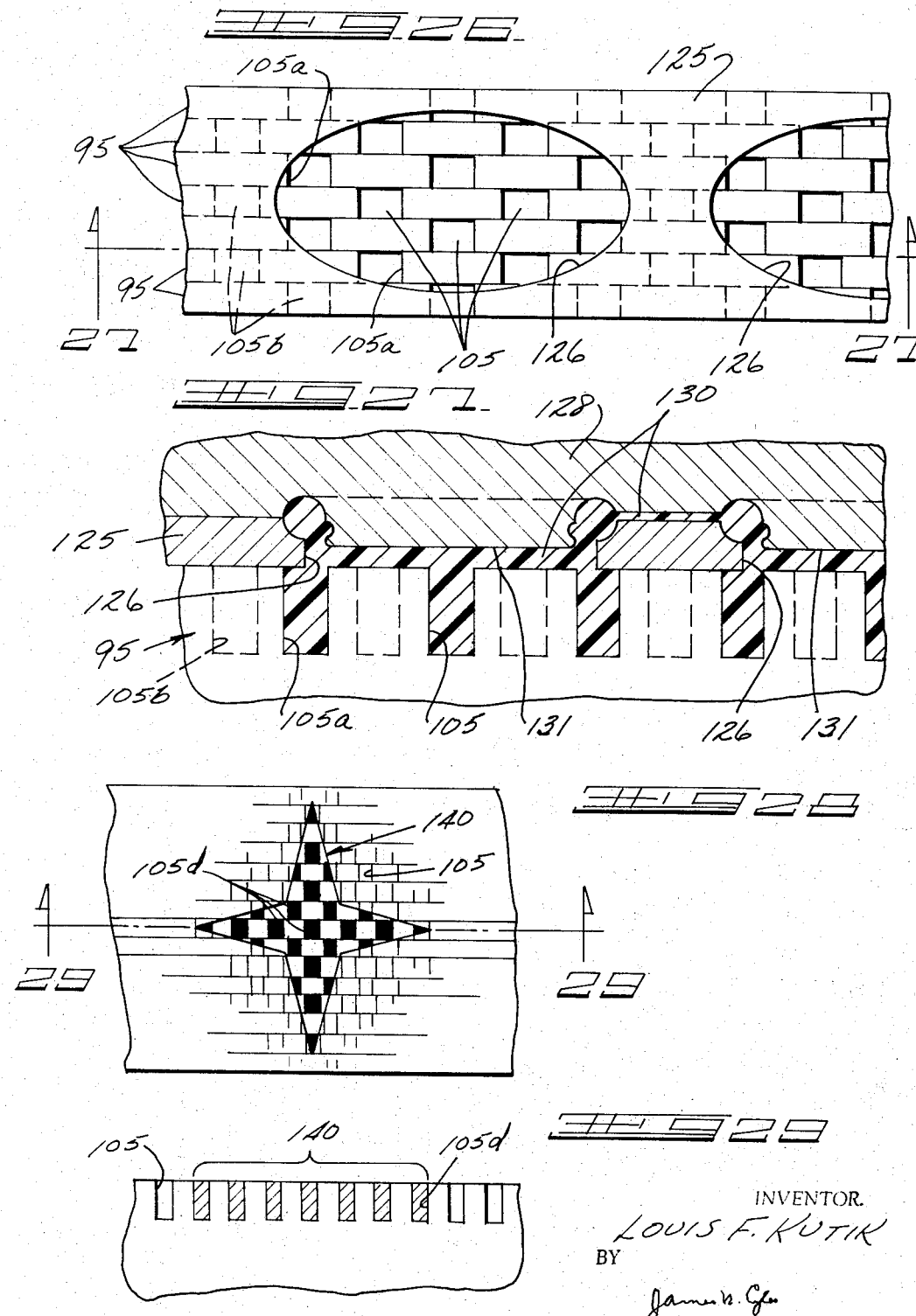

United States Patent Office 3,357,058
Patented Dec. 12, 1967

3,357,058
APPARATUS FOR INJECTION MOLDING A
BRISTLED PRODUCT
Louis F. Kutik, Fort Lauderdale, Fla., assignor of one-
half to Erich W. Gronemeyer, Fort Lauderdale, Fla.
Filed Oct. 31, 1966, Ser. No. 590,849
8 Claims. (Cl. 18—42)

This invention relates to an improved apparatus for forming molded plastic brushes having a head portion and a plurality of bristles integral with the head portion.

This application is a continuation-in-part of my earlier filed application Ser. No. 479,980, filed Aug. 16, 1965, now abandoned, which, in turn, constitutes a division of application Ser. No. 352,689, filed Mar. 17, 1964, now Patent No. 3,214,777.

The forming of a brush having a backing or head portion and integral bristles are broadly known in the art. This invention contemplates the forming of a bristle brush in a novel manner and whereby the bristles are rectangular in cross section and the bristles of each adjacent row being staggered with respect to the other bristles and whereby the bristles have flat sides relatively thin edges, permitting a free flexing of the bristles transversely while the flexing of the bristles longitudinally are retarded due to the cross sectional shape of the bristles, such being particularly desirable in toothbrushes where the rows of the bristles are up and down with respect to the teeth and gives a soft yielding motion to the bristles when applied to a toothbrush. Further it is most desirable that the bristles be relatively soft and yieldable in one direction, such as the up and down motion of the brush when brusing the teeth and yield and conform to the contour of the teeth.

The invention contemplates the provision of a new and novel mold that is formed of a plurality of relatively thin laminations and with the laminations being cut entirely therethrough in the shape of the bristles to be formed and with alternate laminations having their slots staggered so that the material between the slots has overlapping engagement with the next adjacent laminations throughout the forming of the mold and whereby to form a multiplicity of relatively thin bristles in which the plastic will flow and with the group of laminations being held together tightly for disposition into a mold that will simultaneously form all of the hair-like bristles and the backing or head portions of the brush.

A further object of the invention resides in a cavity forming mold wherein a plurality of thin laminations are fixed together in side to side relation and with each alternate lamination being cut entirely therethrough in the shape of the bristles to be formed and with each lamination being disposed between two imperforate laminations whereby the multiplicity of laminations including the plain lamination and the stamped laminations provide a multiplicity of cavities into which the plastic will flow when the mold is disposed into a plastic molding machine.

The invention further provides for a multiplicity of laminations that are formed in groups and whereby the laminations are slotted to form bristle cavities which are in staggered and stepped relation with respect to one another.

Still another object of this invention is the provision of a mold for making a bristled product having a backing portion and a plurality of bristles formed integrally therewith by injecting plasticized material into a multi-part mold cavity, the bristles being injection molded in a plurality of offset slots formed in separate plates abutting one another in face-to-face relation, and wherein any air in the slots is vented during molding between the adjacently abutting plates, and injected material in each slot is solidified in contact with three surrounding plates to form sharp corners on the resulting bristle.

Yet another, and no less important, object of this invention is the provision of an apparatus for making a bristled product by injection molding and including a bristled mold comprising individual laminae which are urged into face-to-face abutment, each of the laminae having bristle-defining slots extending completely through the thickness of the lamina and the laminae being separable to accommodate removal of the molded bristles therefrom.

Novel features of construction and operation of the device will be more clearly apparent during the course of the following description, reference being had to the accompanying drawings wherein has been illustrated the preferred form of the device and wherein like characters of reference are employed to denote like parts throughout the several figures.

In the drawings:

FIGURE 22 is a planned view of a group of bristle-defining laminations forming a part of the apparatus of the present invention;

FIGURE 23 is a sectional view taken along the plane 23—23 of FIGURE 22;

FIGURE 24 is an enlarged fragmentary perspective view of a single bristle slot;

FIGURE 25 is a sectional view of a bristle formed in the slot of FIGURE 24;

FIGURE 26 is a diagrammatic representation of a mold similar to that of FIGURES 18 and 19 but of a different configuration;

FIGURE 27 is a sectional view taken along the plane 27—27 of FIGURE 26;

FIGURE 28 is a view similar to FIGURE 26 but illustrating a mold of different configuration; and FIGURE 29 is a sectional view taken along the plane 29—29 of FIGURE 28.

Figure 1:
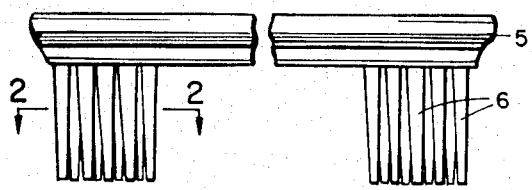
FIGURE 1 is a fragmentary view of a brush constructed in accordance with the invention.
Figure 2:
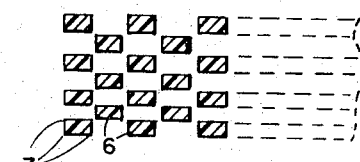
FIGURE 2 is a greatly enlarged horizontal section taken on line 2—2 of FIGURE 1 and illustrating a group of bristles.
Figure 3:
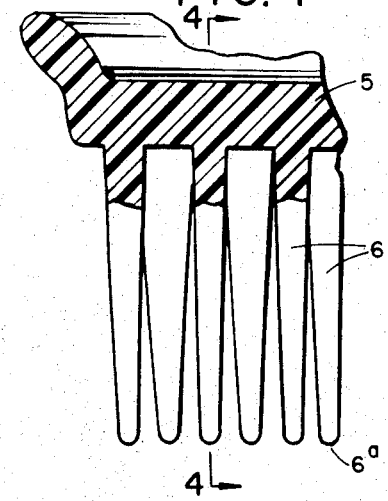
FIGURE 3 is a fragmentary longitudinal section, parts in elevation and illustrating the brush head and the integral bristles.
Figure 4:
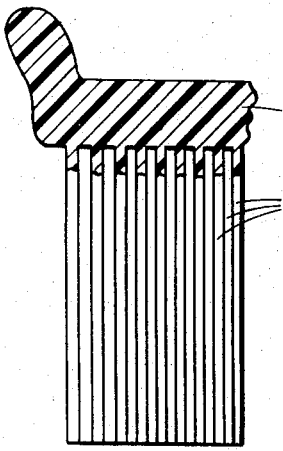
FIGURE 4 is a transverse vertical section taken substantially on line 4—4 of FIGURE 3.
Figure 5:
FIGURE 5 is a transverse fragmentary section illustrating the flexibility of the bristles laterally of the head portion.

Referring specifically to the drawings and particularly to FIGURES 1–5 inclusive there has been provided a head portion 5, having bristles 6 formed integral therewith. As will be observed, the bristles, shown particularly in FIGURE 2 are rectangular in cross section having four sharp edges 7 that perform a scraping action and the bristles of each alternate row, shown at 6' in FIGURE 2 overlap the space between adjacent rows of bristles. As shown in FIGURE 5, the rectangular shape of the bristle permits relatively soft lateral or bending motion to the bristles, such as is desirable in toothbrushes, where the brush is moved in a vertical path over the teeth and creates a relatively soft flexible action calculated to impart a massaging action upon the gums. The bristles may terminate at their ends in any particular design, such as being rounded at 6a, shown in FIGURE 3 or the bristles may be shaped as illustrated in either FIGURES 9, 10 or 11.

Figure 6:
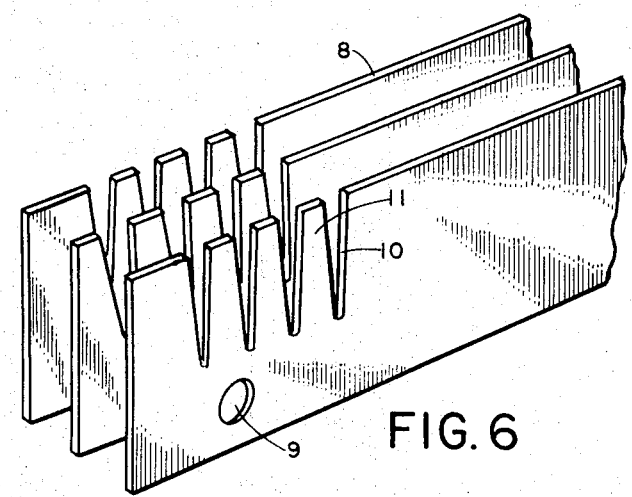
FIGURE 6 is a fragmentary perspective view illustrating the mold forming laminations.
Figure 7:
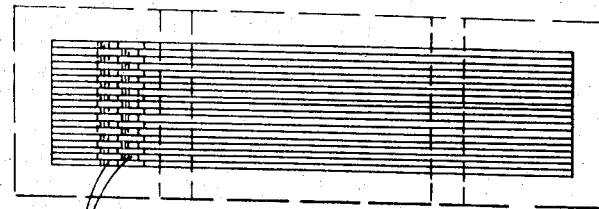
FIGURE 7 is a plan view illustrating the several laminations for the mold and with the laminations being bolted together for disposition within a cavity.
Figure 8:
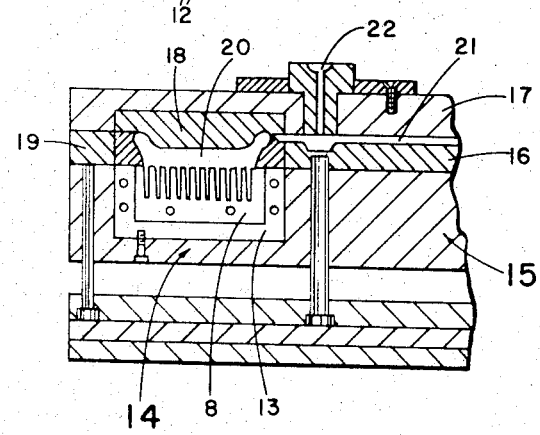
FIGURE 8 is a vertical sectional view of a mold for receiving the cavity of this invention.

The mold of this invention see particularly FIGURES 6 and 7 embody a plurality of very thin laminations 8 and with the laminations being of identical length and apertured at 9 to receive bolts or the like whereby the laminations are tightly engaged with each other for disposition within a mold device of the character shown in FIGURE 8. Each of the laminations 8 are slotted throughout their thickness as indicated at 10 and the slots 10 may be of tapered design or either of the designs of FIGURES 9, 10 and 11. The slots 10 are staggered with respect to each adjacent lamination and with the material of the lamination between each slot, indicated at 11 having overlapping relation with respect to the slots of adjacent laminations and when assembled, as shown in FIGURE 7 form a plurality of cavities 12, throughout the length of the mold and with the cavities being upwardly opening for the reception of fluent plastic that fills the cavities and simultaneously forms the head 5 for the brush and the shape of the resultant bristles will obviously conform to the particular shape of the slots 10. The design of the slot 10 will permit the ready disengagement of the bristles from the mold since the cavities are so shaped that the bristles can be readily pulled away from the mold. The several laminations 8 are formed by stamping the lamination and each lamination is arranged so that each alternate lamination has its slots in staggered relation to adjacent laminations and whereby to form the cavities 12 and after stamping, the laminations are polished to remove any burrs on the metal that would prevent the easy withdrawal of the bristles and to cause the bristles to be accurately formed in rectangular shape for their major length, having the sharp edges 7. With the group of laminations tightly bolted together and with the slots 10 in staggered relation in each alternate lamination, the bristle form cavities formed by the group of laminations is inserted within a mold 13 in which the group of laminations are mounted and the cavities 12 are installed within a rest 14 of a movable mold section 15 of conventional construction. The mold section 15 carries a stripper plate 16 and a bolster plate 17 for holding the elements 18 and 19, that are recessed at 20, in accordance with the shape of the head portion 5. The plates 16 and 17 are grooved to form runners 21 receiving fluent plastic from a sprue 22 to flow in opposite directions and into the cavity 12 and simultaneously forming the head 5 for the brush. The mold apparatus may be of any desirable configuration but here has been illustrated as one desirable manner of mounting the group of laminations for receiving the plastic and to also form the integral head 5.

Figure 9:
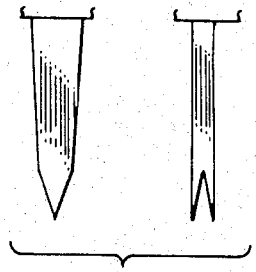
FIGURE 9 is a side and edge elevational view of a modified form of bristle.
Figure 10:
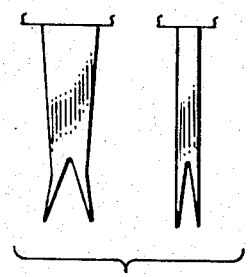
FIGURE 10 is a side and edge elevation of a further modified form of bristle.
Figure 11:
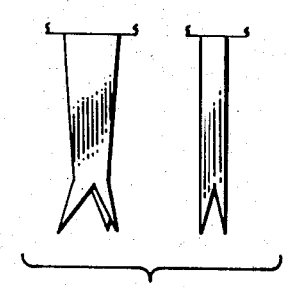
FIGURE 11 is a side and edge elevation of a further modified form of bristle.

The several shapes of bristles illustrated in FIGURES 9, 10, and 11 are only certain variations of bristles that can be formed with a device of this nature. The forked bristles may be formed in any desirable manner as by filling or cutting away certain area of the bottoms of the slots 10 in each lamination and while the bristles here shown indicate forks and other designs, they are within the confines of the cavity formed by the slots 10.

It will be apparent from the foregoing that a very novel apparatus has been provided to form a mold for a multiplicity of rectangular bristles and with the bristles having four sharp corners calculated to provide a scraping action over an area to be cleaned. The mold forming laminations 8 are economically formed by stamping of sheet metal of a thickness calculated to determine the transverse thickness of the bristles to be formed and the mold formed by the laminations 8 is cheap to manufacture and assembled with a minimum of effort into a compact mold for subsequent disposition into a molding machine. It should be pointed out, that the slots 10 are stamped entirely through the laminations 8 and then polished on opposite sides to remove any undercut portions of metal that might adhere to the edges of the slots and restrict the easy removal of bristle. The polishing also permits the several laminations to be bolted together tightly and forming the multiplicity of cavities 12.

Figure 12:
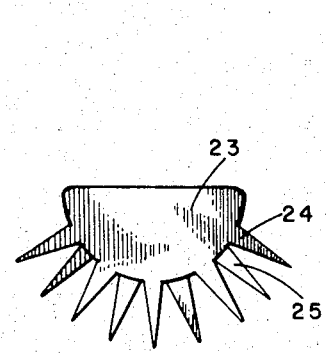
FIGURE 12 is a further modified form of mold lamination for forming an arcuate brush.

In FIGURE 12, there has been illustrated an arcuate brush forming lamination 23 for forming bristles 24 and alternate staggered bristles 25. This form of the invention is particularly useful in molding brushes of the type generally employed as hair brushes.

Figure 13:
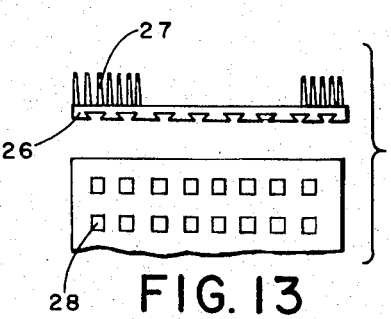
FIGURE 13 is a fragmentary side elevation and a bottom plan view of a molded device for forming flooring tile.

Now, referring to FIGURE 13, there has been provided a structure similar to that previously described and here illustrating a backing sheet 26, carrying the bristles 27. The backing sheet is provided with a plurality of dovetail integral recesses 28 for the reception of knockout pins employed in the mold structure. The structure of FIGURE 13 is primarily for use in the manufacture of floor tile or the like and usually is square in top plan view and of any desirable dimension.

Figure 14:
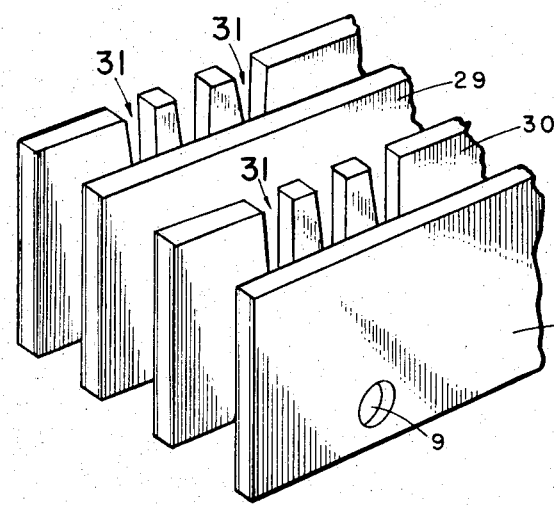
FIGURE 14 is a perspective view of a group of laminations showing a modified form of cavity forming mold.
Figure 15:
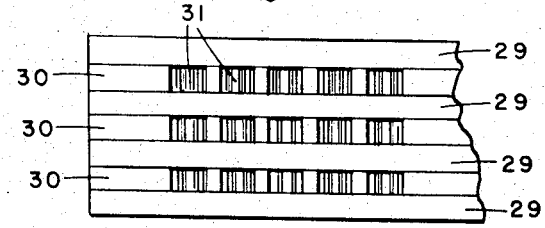
FIGURE 15 is a fragmentary plan view of the mold forming laminations of FIGURE 14.

Referring now to FIGURES 14 and 15, there has been illustrated a modified form of mold forming laminations wherein each of the molds have laminations of identical dimensions. The outermost lamination in each mold is formed of a plain or imperforate plate 29 and each alternate plate 29 receives therebetween a stamped mold plate 30, forming the cavities 31. Actually the mold plates 30 are substantially identical to the plates 8 of the first form of the invention but here, the imperforate plates 29 form a closure for the cavities 31 upon each side of the plates 30.

Figure 16:
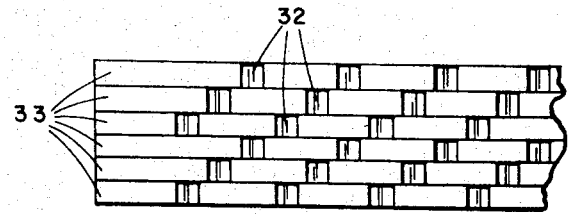
FIGURE 16 is a further modified form of an arrangement of stamped laminations forming bristles in staggered or stepped relation.

In FIGURE 16 there has been illustrated a further modified form of mold device forming the cavities 32. Here, the several plates 33 have the slots 10 stamped therethrough and with the plates subsequently to be assembled as a cavity forming mold by disposing each group of plates, being three in number so that the plates are disposed in position as a mold with the cavities in staggered or stepped relation. The operation of the forms of the invention in FIGURES 14–16 as far as the molding is concerned is substantially identical to the form of the bristles as illustrated in the first form of the invention.

Figure 17:
FIGURE 17 is a cross section through a modified form of bristle.

In FIGURE 17, there has been illustrated a modified form of bristle 34 but here, the bristle is formed substantially square in cross section and with the usual taper downwardly from the head sufficient to permit the bristle to be withdrawn from its cavity. This bristle also embodies the four sharp corners 35, similar to the other forms of the invention.

Figure 18:
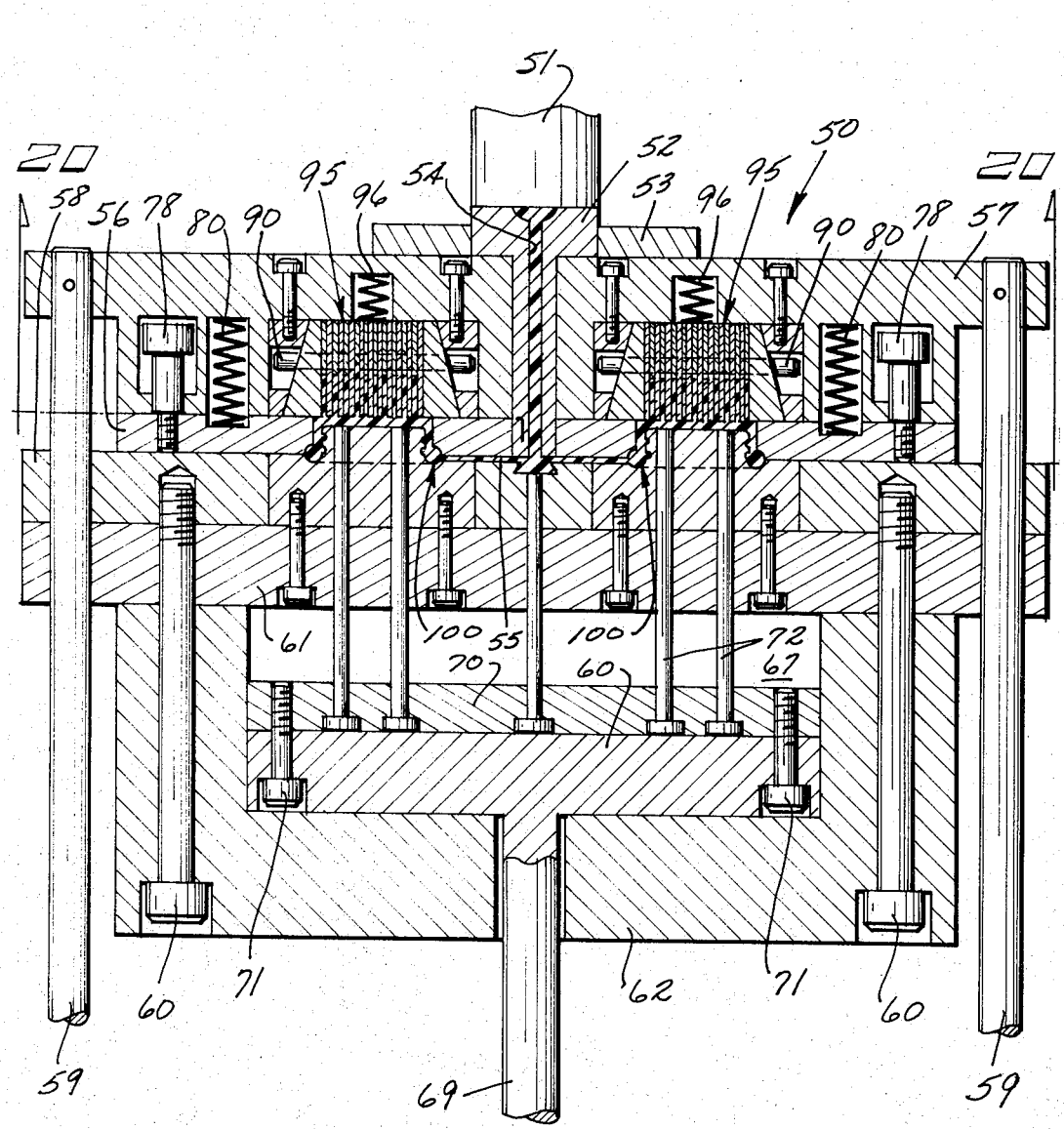
FIGURE 18 is a transverse sectional view through a different form of molding apparatus of the present invention.
Figure 19:
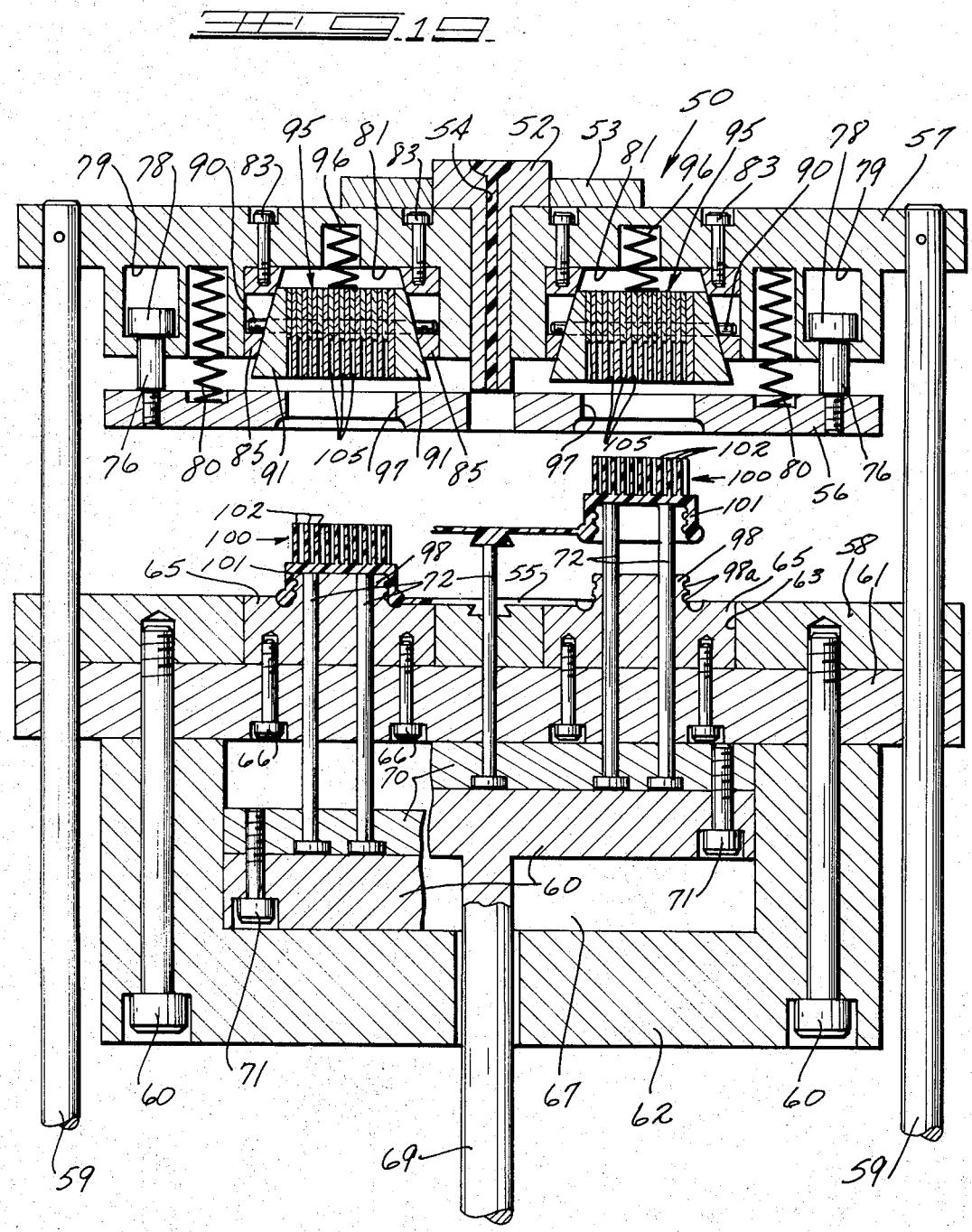
FIGURE 19 is a view similar to FIGURE 18, but illustrating the apparatus in an adjusted position.
Figure 20:
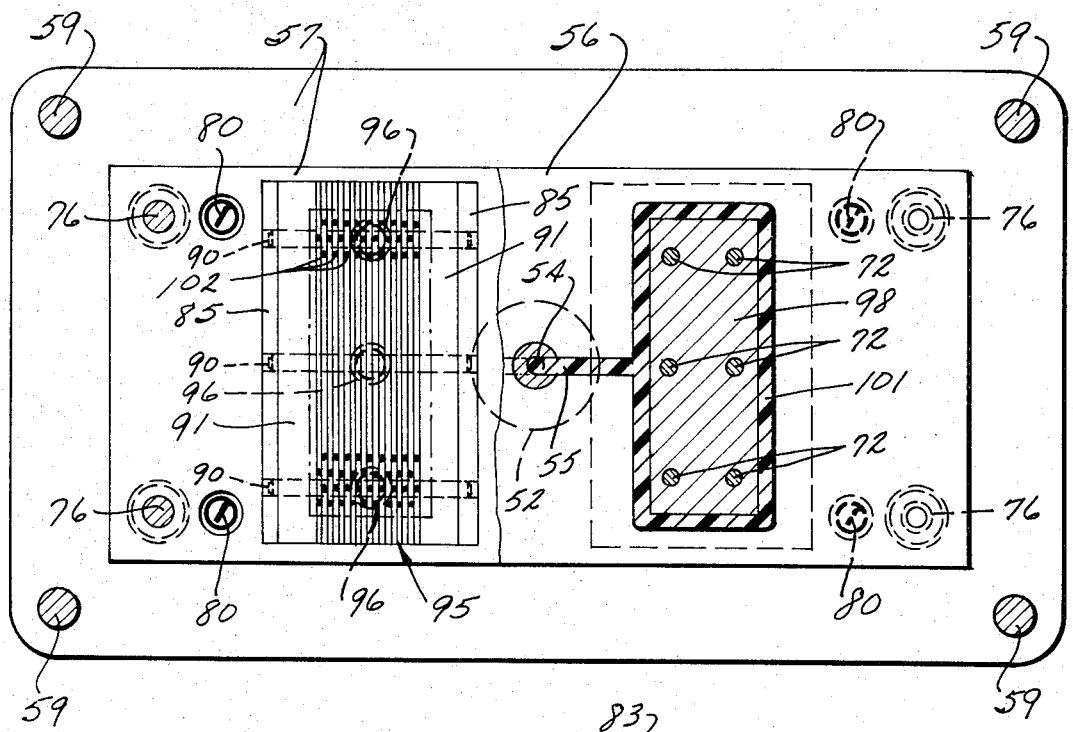
FIGURE 20 is a sectional view taken along the planes 20—20 of FIGURE 18.

In that embodiment of the invention illustrated in FIGURES 18–21, reference numeral 50 refers generally to a multi-part injection mold illustrated in an assembled or molding position in FIGURE 18 and illustrated in a separated or product removal position in FIGURE 19.

More specifically, the mold 50 receives plasticized material, such as polyethylene, polypropylene or the like from the outlet end 51 of a conventional extruder (not shown) of the reciprocating screw type. Alternatively, a conventional piston-type injection molding machine or other source of plasticized material under pressure may be utilized.

The plasticized material flows through a nozzle 52 held in place by a retaining ring 53 through an injection channel 54 into a sprue and runner passage arrangement of conventional type and including feed passages 55 beneath a stripping plate 56 interposed between an upper mold plate 57 and a lower mold plate 58. The upper mold plate 57 carries a pair of guide rods 59 upon which the lower mold plate 58 is guided for relative movement. Assembled to the lower mold plate 58 by means of bolts 60 are a backup plate 61 and an ejector housing 62.

The lower mold plate 58 is provided with a pair of transversely spaced rectangular apertures 63 into which are inserted force plugs 65, the mold plate 58 and the force plugs 65 being transversely slotted to provide the material flow passages 55. The force plugs 65 are retained in the apertures 63 by suitable retaining means 66 projecting through the backup plate 61. The ejector housing 62 is provided with a central aperture 67 within which an ejector plate 68 is slideably mounted for actuation by an ejector rod 69. Surmounting the ejector plate 68 is an ejector pin retaining plate 70 which is secured to the plate 68 by bolts 71 to secure a plurality of knockout pins 72 to the ejector plate 68 for movement therewith.

The upper mold plate 57 has the intermediate or stripper plate 58 secured thereto by means of shoulder bolts 76 having enlarged heads 78 slideable in vertical elongated recesses 79 formed in the top plate 57. Compression springs 80 interposed between the top plate 57 and the stripper plate 56 urge the stripper plate downwardly to its position illustrated in FIGURE 19 of the drawings.

Figure 21:
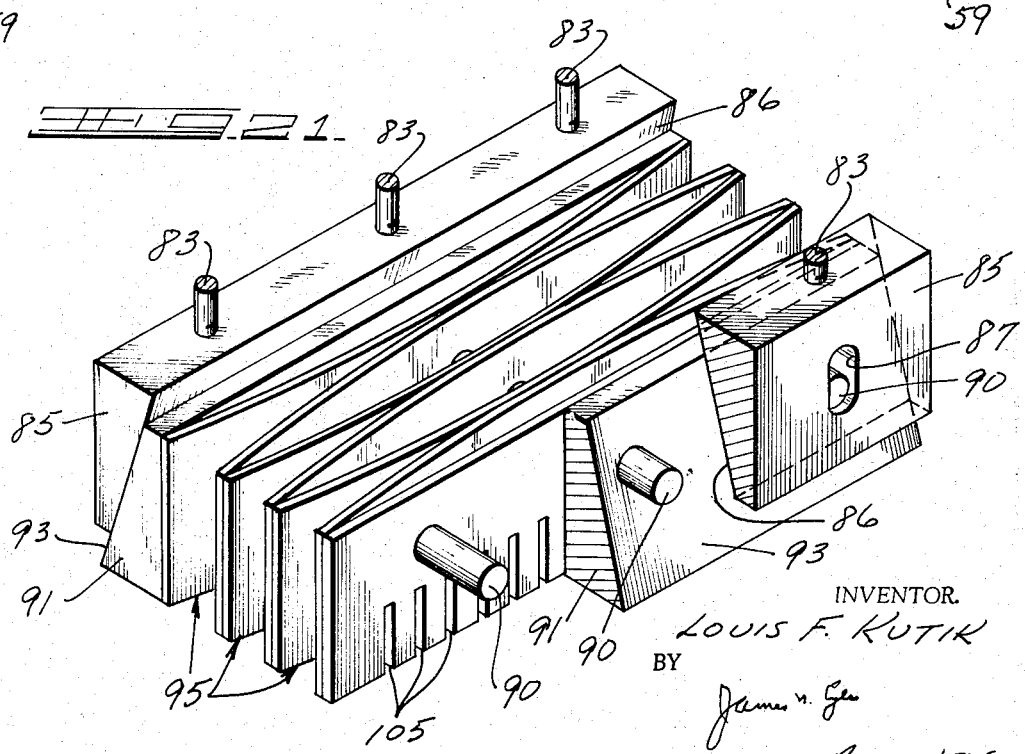
FIGURE 21 is a greatly enlarged and exaggerated perspective view, with parts broken away and in section, illustrating a specific portion of the apparatus.

The upper plate 57 has a pair of downwardly opening, transversely spaced recesses 81 therein, these recesses having secured therein, as by bolts 83, a pair of vertically disposed cam plates 85. These cam plates 85, which are fixedly secured in the recesses 81, are best illustrated in FIGURE 21 of the drawings, wherein it will be seen that the plates 85 are arranged in transversely spaced relation in each recess 81, the confronting cam faces 86 of the plates 85 being inclined downwardly and outwardly of the recesses 81.

Further, it will be seen that each such cam plate is provided with a pair of longitudinally spaced, vertically elongated slots 87 adapted to receive transversely projecting guide pins 90 which serve to retain cam blocks 91 between the cam plates 85 while accommodating relative movement of the plates 85 and the blocks 91.

Interposed between the cam blocks 91 are a plurality of laminae or laminations 95 which are identical with the laminations heretofore disclosed in connection with earlier embodiments of this invention. The laminae 95 are traversed by the pins 90 to be supported on the pins against vertical and lateral displacement. Since the laminae 95 are formed of relatively thin or "shim" stock, the laminae will have some inherent longitudinal distortion. In other words, the laminae will "bow" or distort individually to a non-planar longitudinal configuration, as indicated somewhat schematically in FIGURE 21 of the drawings. Of course, the bowing of the laminae 95 as illustrated in FIGURE 21 is somewhat idealized and is shown as being uniform in a smooth, parabolic form. However, some inherent bowing will occur in each of the laminae 95, this distortion always tending to spread the cam blocks 91, the blocks 91 sliding transversely upon the pins 90 into face-to-face confrontation with the cam surfaces 86. Thus, the cam surfaces 93 of the cam blocks 91 will always be in camming contact with the corresponding faces 86 of the cam plates 85.

The bristle mold subassembly, consisting of the laminae 95, the transverse pins 90 and the cam bolcks 91 is urged downwardly in the recesses 81 by compression springs 96 interposed between this subassembly and the plate 57.

From the foregoing, it will be appreciated that the die of the present invention is adapted to form a bristled product having a plurality of individual bristles integral with a backing portion. From FIGURE 19, it will be seen that the final product 100 comprises a hand brush or the like including a backing portion 101 and a plurality of bristles 102 integral with the backing portion. The plurality of bristles is formed in the laminae 95, as will be hereafter more fully described in detail, while the backing portion has its exterior side surface defined by vertical passages 97 formed in the plate 56, and the remainder of the backing portion is defined by a suitably contoured embossment 98 formed on the force plugs 65.

Turning now to FIGURES 22 through 24 of the drawings, it will be seen that each of the laminae 95 is provided with a plurality of vertically extending elongated slots 105. Each such slot 105 projects completely through the thickness dimension 106 of each lamination, this dimension defining the thickness of the bristle to be formed; each slot 105 has a height dimension 107 which corresponds to the length of a bristle to be formed in the slot; and each slot 105 has a width dimension 108 which corresponds to the width or transverse dimension of the bristle to be formed therein. Thus, the complete dimensions of the bristles to be formed are determined by the thickness of the lamina and the dimensions of the slots therein.

Further, each edge of each of the slots 105 may be beveled to obtain unusual advantages. For example, in FIGURE 24, it will be seen that the vertical exterior edges 110 of each of the slots 105 may be beveled; that the lower arcuate extremities 111 of the bottom 112 of the slot 105 also may be beveled; and that the upper open edges 113 of the slots 105 are also beveled.

As illustrated in FIGURE 22 of the drawings, the slots 105 are spaced longitudinally of the length of each lamina 95 through a distance which is greater than the dimension 108. Thus, there is a greater distance between slots than there is slot width 108, and by assembling the laminae 95 in face-to-face abutment, the non-slotted portions of the laminae adjacent to the slotted portion of a given lamina overlap the slots to close the slots laterally.

More specifically, it will be noted from FIGURE 22 that the slots 105 in the lamina 95a are closed laterally by the non-slotted portions of the laminae 95b and 95c. Further, by beveling the edges 110, 111 and 113, a final bristle 102 of the form illustrated in FIGURE 25 is obtained, the bristle having sharpened edges 102a extending longitudinally along each longitudinal edge thereof. A similar ridge or projection will extend around the free end of the bristle, by virtue of the beveling of the edge 111. The root of the bristle, i.e. the area of juncture between the bristle 102 and the backing portion 101 will be defined by fillets formed by material filling the bevels 113. Even if the edges 110 and 111 and the portions 113 were not beveled, each individual bristle is formed between three separate and distinct laminae, and the material solidifying at the lines of juncture of the laminae will necessarily form sharp corners on the resulting bristle. Thus, an effective scrubbing action will be obtained from the provision of the bristles having sharp marginal edges, which edges can be accentuated by beveling as shown in FIGURES 22 through 25.

Directing attention now to the operation of the device, the first step involves the closing of the mold 50 to the condition illustrated in FIGURE 18 of the drawings, i.e., the plate 58 is advanced on the guide rods 59 into abutment with the plate 56, the force of such abutment compressing the springs 80 and 96. Contact between the plate 56 and the subassembly of the laminae 95, the transverse pins 90 and the cam blocks 91 urges the subassembly upwardly against the compression of the spring 96, the contracting cam surfaces 86 and 93 transversely displacing the laminae 95 into tight face-to-face contact as illustrated in FIGURE 22. Further, the force plugs 98 enter the plate apertures 97, and the composite mold cavity is completely assembled with the backing portion mold cavity being defined between the force plugs 98 and the plate apertures 97 directly underlying and communicating with the slots 105 in the laminae 95. Next, plasticized plastic material is introduced to the nozzle channel 45 and the transverse passages 55 into each of these composite molds. The material first fills the backing portion of the mold, and the material subsequently flows upwardly into the slots 105. Even though the action of the cam surfaces 86, 93 have urged the laminae 95 into tight face-to-face abutment, air can still escape between the plates, thus automatically and inherently venting each of the slots. Thus, any entrapment of air in the slots is averted, and there will be no charring or discoloration of the material and residual heat build up at the blind ends of the bristle slots.

After the lapse of a sufficient period of time to insure the solidification of the plasticized material in contact with the chill surfaces of the composite mold, the mold is opened to its configuration of FIGURE 19. The springs 96 then urge the bristle mold subassembly downwardly so that the inherent distortion of the laminae 95 will tend to space the laminae from one another, as schematically illustrated in FIGURE 21. Due to the inherent distortion of the plates or laminae 95 (once the plates have been released from the lateral compression by virtue of the cam surfaces 86, 93) the laminae 95a, 95b and 95c will spread laterally. Thus, a bristle formed in a slot 105 in the lamina 95a will be released at its transverse extremities by relative movement of the laminae 95b and 95c away from the lamina 95a. Although this motion is slight, it is substantially uniform since the plates are all somewhat distorted, and an effective mold release action is obtained.

Next, the springs 80 push the plate 56 from abutment with the bristle mold subassembly until such relative motion is limited by abutment of the bolt heads 70a in the recesses 79. Then, plates 56 and 58 move out of abutment. Inasmuch as the force plugs 98 are provided with undercut grooves 98a, the product 100 remains upon the force plugs and moves with the plate 58 away from the remainder of the mold as the mold is opened. Finally, upward movement of the ejector plate 68 will elevate the pins 72 to raise the product 100 and the attached runners and sprues from the force plug. The product 100 can now be removed manually or by means of an appropriate take-out mechanism (not shown).

Another aspect of the invention is illustrated in FIGURES 26–29, these figures representing fragmentary portions of a die constructed in accordance with the previous disclosure of FIGURES 18 through 25.

As best shown in FIGURES 26 and 27, a plurality of elongated, slotted laminae or plates 95 may serve to define several distinct bristle cavity molds in communication with more than one adjacent backing die. In FIGURE 27, each of the lamina 95 underlie a plate 125 provided with a plurality of openings 126 thereof receiving therein a plurality of projections 127 which are actually force plug projections from a multiple plate 128. Thus it will be seen that the single bristle mold subassembly, as heretofore described, can serve to form bristles integrally with a plurality of separate and distinct backing portions.

The plasticized material 130 filling those slots registering with the backing portion mold recess, as exemplified by the slots 105 of FIGURES 26 and 27, forms bristles integral with the backing portion. Similarly, slots such as the slot 105a in partial registry with the backing portion mold cavity 131 will be filled with plasticized material, while the slots 105b lying outside the confines of the backing mold recess 131 will not receive plasticized material. Upon opening of the mold, it will be noted that the apertures 126 in the plate 125 partially overlie the recesses 105a, and upward movement of the force plug portions 127 of the plate 128 with the adherent final product thereon will not remove the material from the slots 105a, since this material will hang beneath the edge of the plate aperture 126.

Thus, the material filling the slots 105a will remain in the slots and will block the entry of plasticized material thereinto during the next subsequent injection molding step. Thus, bristles will effectively be formed on the final product only in those slots 105 which register fully with a backing portion mold cavity 131.

In this manner, one can manufacture brushes, floor tile, or other bristled products having backing portions of any desired contour by utilizing standard bristle mold subassemblies. Further, one bristle mold subassembly may form a plurality of products by utilizing more than one backing portion cavity 131. The bristle mold subassemblies, including the plates or laminae 95 provided with the slots 105, are made to the desired dimensions of the bristles themselves, as explained in connection with FIGURES 22–25 and without regard to the shape, configuration or other characteristics of the backing member.

Another modification of this technique is illustrated in FIGURES 28 and 29 of the drawings. Assuming that one wishes to form indicia on a brush, floor tile, bath mat or the like, it is merely necessary to block those grooves or slots 105 of the bristle mold subassembly in which it is desired that bristles not be formed. For example, if one wished to make the four pointed star indicated generally at 140, it is only necessary to block the desired slots 105d by drawing, writing, or otherwise placing a heat resistant grease or other material capable of resisting the temperatures of the plasticized material in those slots 105d which it is desired not to fill.

I claim:
1. In an apparatus for making a bristled product by injection molding, said product having a backing portion and at least one individual bristle integral therewith, the improvements of an injection mold comprising at least three bristle-defining plates, means retaining said plates in face-to-face abutment, at least one of said plates having (1) a height greater than the length of a bristle, (2) a thickness corresponding to one transverse dimension of a bristle, (3) a length at least as great as one complete dimension of the product backing portion, and (4) at least one slot extending completely through the thickness thereof and of a height corresponding to the length of a bristle, those plates in face-to-face abutment with said at least one plate having planar non-slotted surfaces closing the sides of the slot therein, and means defining an additional cavity having the contour of the backing portion of said product freely communicating with said slot.

2. In an apparatus as defined in claim 1, the further improvement of said plates each being of a length greater than said one complete dimension, and a plurality of said additional cavity-defining means communicating with the slots of said plates.

3. In an apparatus as defined in claim 1, the further improvement of said retaining means including cam means for urging said plates into abutment during a molding operation and accommodating relative separation of said plates to facilitate removal of a molded product from said slots.

4. In an apparatus for making a bristled product by injection molding, said product having a backing portion and a group of individual bristles integral therewith, the improvements of an injection mold comprising a plurality of individual laminae, means urging said individual laminae into face-to-face abutment, each of said laminae having (1) a height greater than the length of the product bristles, (2) a thickness corresponding to the transverse dimension of the product bristles, (3) a length at least as great as one complete dimension of the group of bristles, and (4) a plurality of longitudinally spaced slots opening freely onto one longitudinal edge of said lamina, each such slot (a) extending completely through the thickness of the lamina, (b) having a height corresponding to the length of a bristle, and (c) having a width corresponding to the other transverse dimension of the bristle, the slots in adjacent abutting laminae being offset from one another longitudinally of the laminae so that the open sides of each slot are closed by non-slotted portions of the adjacent lamina, and means contacting said one longitudinal edge of at least some of said laminae, said contacting means partially enclosing an internal cavity corresponding to the backing portion of said bristled product, and said cavity freely communicating with the laminae slots in registry therewith.

5. In an apparatus as defined in claim 4, the further improvements of said laminae normally being inherently non-planar, said means urging said laminae into abutment during injection molding being effective (1) to overcome the non-planar characteristic thereof, and (2) to accommodate the resilient return of said laminae to a non-planar configuration following molding to facilitate removal of the molded product.

6. In an apparatus for making a bristled product by injection molding and wherein a multi-part mold defines, respectively, (a) the product bristles and (b) the product backing portion integral with the bristles, the improvement in the bristle-defining mold part, comprising a plurality of relatively thin laminate each having slots therein opening onto one longitudinal edge and extending completely through the thickness thereof so as to open each side thereof, said slots each being of a width corresponding to one dimension of a bristle to be formed and being spaced longitudinally of the laminae through a distance greater than the one slot dimension, and each slot being of a depth corresponding to the length of a bristle to be formed, and means retaining said laminae in assembly with the slots of adjacent laminae being longitudinally offset to close each slot by an unslotted portion of the next adjacent laminae.

7. In an apparatus as defined in claim 3, the further improvements of said plates being slightly non-linear in their length dimension so that adjacent plates normally are not in full face-to-face abutment, and said retaining means including a pair of cam blocks between which the plates are interposed, means interconnecting the plates and the cam blocks (1) for joint movement toward and away from said additional cavity-defining means and (2) accommodating relative movement of the plates into and out of face-to-face abutment, relatively fixed cam means between which the cam blocks and the plates are interposed, said cam blocks and cam means respectively having inclined cam faces oriented so that (1) the cam blocks urge the plates into face-to-face abutment upon joint plate-block movement in a first direction and (2) the cam blocks accommodate relative movement of the plates and relative separation thereof upon joint plate-block movement in a second direction, means moving said additional cavity-defining means (a) in one direction to jointly move the plates and blocks in said first direction for an injection operation and (b) in a reverse direction to accommodate joint plate-block movement in said second direction, means for injecting plasticized material into said additional cavity-defining means after movement thereof in said one direction, and spring means effecting joint plate-block movement upon movement of said cavity-defining means in said reverse direction to relatively separate said plates.

8. In an apparatus as defined in claim 6, the further improvement of said laminae normally being inherently non-planar, said retaining means urging said laminae into full face-to-face abutment with one another, and guide pins traversing each of said laminae to secure said laminae against relative movement except for movement of said laminae into and out of such face-to-face abutment.

References Cited
UNITED STATES PATENTS

| | | | |
|---|---|---|---|
| 2,266,831 | 12/1941 | Tegarty | 249—141 |
| 2,274,060 | 2/1942 | Hart | 249—160 X |
| 2,306,732 | 12/1942 | Huxham | 18—44 |
| 2,349,977 | 5/1944 | Mazzoni | 18 |
| 2,355,744 | 8/1944 | Myers | 18—42 |
| 2,592,296 | 4/1952 | Kutik | 18 |
| 2,651,810 | 9/1953 | Snyder | 18 |
| 2,859,478 | 11/1958 | Glasson | 18 |
| 3,004,291 | 10/1961 | Schad | 18 |
| 3,098,262 | 7/1963 | Wistozky | 18 |
| 3,125,776 | 3/1964 | Lilley | 249—119 X |
| 3,173,177 | 3/1965 | Rybka | 18 |
| 3,214,777 | 11/1965 | Kutik | 18 |
| 3,312,583 | 4/1967 | Rochlis | 18—44 |

FOREIGN PATENTS

| | | |
|---|---|---|
| 21,780 | 8/1930 | Australia. |
| 520,679 | 6/1953 | Belgium. |
| 670,147 | 9/1963 | Canada. |
| Ad. 52,256 | 8/1943 | France. |
| 868,957 | 3/1959 | Great Britain. |
| 918,041 | 2/1963 | Great Britain. |

J. HOWARD FLINT, JR., *Primary Examiner.*